US012735939B2

(12) United States Patent
Reynolds

(10) Patent No.: US 12,735,939 B2
(45) Date of Patent: Sep. 15, 2026

(54) SINGLE-UNIT DOUBLE-TRACK BLIND SYSTEM WITH FLY NET AND BLIND

(71) Applicant: Blind Screen Ltd, Nottingham (GB)

(72) Inventor: Lenny Reynolds, Derby (GB)

(73) Assignee: Blind Screen Ltd (GB)

( * ) Notice: Subject to any disclaimer, the term of this patent is extended or adjusted under 35 U.S.C. 154(b) by 0 days.

(21) Appl. No.: 19/164,200

(22) PCT Filed: Dec. 22, 2023

(86) PCT No.: PCT/GB2023/053370
§ 371 (c)(1),
(2) Date: Sep. 11, 2025

(87) PCT Pub. No.: WO2024/189302
PCT Pub. Date: Sep. 19, 2024

(65) Prior Publication Data

US 2026/0117585 A1 Apr. 30, 2026

(30) Foreign Application Priority Data

Mar. 11, 2023 (GB) ..................................... 2303598

(51) Int. Cl.
*E06B 9/264* (2006.01)
*E06B 9/262* (2006.01)
(Continued)

(52) U.S. Cl.
CPC .............. *E06B 9/264* (2013.01); *E06B 9/262* (2013.01); *E06B 9/522* (2013.01);
(Continued)

(58) Field of Classification Search
CPC ....... E06B 2009/524; E06B 2009/2423; E06B 2009/2447; E06B 2009/2452;
(Continued)

(56) References Cited

U.S. PATENT DOCUMENTS 252,873 A * 1/1882 Freese ........................ E06B 3/28 49/62
267,618 A * 11/1882 Tribe ........................ E06B 9/54 160/25
(Continued)

FOREIGN PATENT DOCUMENTS

AT 397413 B * 4/1994 ............... E06B 9/17
CH 684 205 A5 7/1994
(Continued)

OTHER PUBLICATIONS

"Chinese First Office Action for application No. 202380097185.X, dated Jan. 9, 2026, 8 pages".

*Primary Examiner* — Johnnie A. Shablack
(74) *Attorney, Agent, or Firm* — Billion & Armitage

(57) ABSTRACT

A single-unit double-track blind system comprises two tracks, one for a fly net (28) and the other for a blind (27), combined in a single unit. The tracks may be oriented so that one of the fly net (28) and the blind (27) opens horizontally and the other opens vertically. The unit comprises four corner pieces (1A, 1B, 3A, 3B) connected by four linear pieces (10A, 10B, 13, 18). The linear pieces may have a stepped profile, whereby inner portions of the linear pieces carrying one of the tracks can fit inside a window or door opening, while outer portions of the linear pieces carrying the other of the tracks can overlap the edge of the opening and rest against a wall (40) or frame adjacent to it. The overlap hides any gap between the unit and inside of the opening, thereby reducing the precision required when measuring the opening for installation of the unit.

3 Claims, 6 Drawing Sheets

(51) Int. Cl.
*E06B 9/52* (2006.01)
*E06B 9/24* (2006.01)

(52) U.S. Cl.
CPC ................. *E06B 2009/2452* (2013.01); *E06B 2009/2625* (2013.01); *E06B 2009/2627* (2013.01)

(58) Field of Classification Search
CPC .. E06B 2009/2643; E06B 9/264; E06B 9/522; E06B 9/52
See application file for complete search history.

(56) References Cited

U.S. PATENT DOCUMENTS

| | | | | | |
|---|---|---|---|---|---|
| 457,155 | A | * | 8/1891 | Heartwell, Jr. | E06B 9/52 160/184 |
| 1,395,492 | A | * | 11/1921 | Guggenberger | E06B 9/54 24/265 A |
| 1,582,111 | A | * | 4/1926 | Wogan | E06B 7/084 160/90 |
| 2,181,897 | A | * | 12/1939 | Kapp | E06B 9/264 160/175 |
| 2,216,414 | A | * | 10/1940 | Kapp | E06B 9/302 160/178.3 |
| 2,311,300 | A | * | 2/1943 | Dubour | E06B 7/084 454/224 |
| 2,467,431 | A | * | 4/1949 | Kellogg | E06B 9/264 160/34 |
| 2,569,942 | A | * | 10/1951 | Milnor | E06B 9/52 160/91 |
| 2,775,798 | A | * | 1/1957 | Bent | E06B 3/44 160/90 |
| 4,611,648 | A | * | 9/1986 | Anderson | E06B 9/264 49/64 |
| 4,658,879 | A | * | 4/1987 | Van Klompenburg | E06B 9/54 160/31 |
| 4,679,406 | A | | 7/1987 | Weiblen | |
| 4,884,613 | A | * | 12/1989 | Komori | E06B 3/2605 160/90 |
| 4,913,213 | A | * | 4/1990 | Schnelker | E06B 9/264 160/107 |
| 5,282,504 | A | * | 2/1994 | Anderson | E06B 9/02 49/64 |
| 5,392,835 | A | * | 2/1995 | Wildt | E06B 9/17076 160/269 |
| 5,979,533 | A | * | 11/1999 | Dupuie | F24F 1/0003 160/84.06 |
| 6,119,756 | A | * | 9/2000 | Tatro | E06B 9/52 160/90 |
| 8,656,978 | B2 | * | 2/2014 | Goldenberg | E06B 9/58 160/31 |
| 9,512,666 | B2 | * | 12/2016 | Reyher | E06B 3/6715 |
| 10,214,958 | B2 | * | 2/2019 | Hall | E06B 9/72 |
| 10,837,228 | B2 | * | 11/2020 | Roberts | E06B 9/52 |
| 11,203,898 | B2 | * | 12/2021 | Roberts | E06B 9/52 |
| D1,102,183 | S | * | 11/2025 | Reynolds | D6/575 |
| 2003/0041537 | A1 | * | 3/2003 | Glover | E06B 3/00 52/204.5 |
| 2004/0256061 | A1 | * | 12/2004 | Krosenbrink | E06B 9/40 160/84.03 |
| 2007/0272365 | A1 | * | 11/2007 | Wingert | E06B 9/52 160/98 |
| 2011/0036519 | A1 | * | 2/2011 | Doogan | E06B 9/40 160/368.1 |
| 2020/0270941 | A1 | * | 8/2020 | Grife | E06B 9/58 |
| 2021/0095521 | A1 | * | 4/2021 | McNeill | D03D 1/00 |
| 2023/0313603 | A1 | * | 10/2023 | Nelissen | E06B 9/322 160/84.01 |
| 2024/0263510 | A1 | * | 8/2024 | Crowley | E06B 9/262 |

FOREIGN PATENT DOCUMENTS

| | | | | | |
|---|---|---|---|---|---|
| CN | 203626578 | U | * | 6/2014 | |
| CN | 212898266 | U | * | 4/2021 | |
| CN | 113389481 | A | * | 9/2021 | E06B 9/54 |
| DE | 19839332 | A1 | * | 3/2000 | E06B 9/17 |
| DE | 10132545 | A1 | * | 1/2003 | E06B 9/54 |
| DE | 202009011328 | U1 | * | 11/2009 | E06B 9/58 |
| EP | 0 254 896 | A2 | | 2/1988 | |
| ES | 2 346 310 | T3 | | 10/2010 | |
| FR | 3048446 | A3 | * | 9/2017 | E06B 9/42 |
| KR | 101883409 | B1 | * | 7/2018 | E06B 9/54 |
| KR | 20240069278 | A | * | 5/2024 | E06B 9/52 |
| WO | WO-2009089597 | A1 | * | 7/2009 | E06B 9/40 |
| WO | 2018/232439 | A1 | | 12/2018 | |

* cited by examiner

SINGLE-UNIT DOUBLE-TRACK BLIND SYSTEM WITH FLY NET AND BLIND

FIELD OF INVENTION

The present invention relates to window treatments, specifically to a single-unit double-track blind system that allows for dual use of a fly net and a blind. The invention is also applicable to doors that require protection from insects and thermal insulation.

BACKGROUND

Window and door screens such as blinds and fly nets are commonly used to provide privacy and protection from insects. However, existing solutions require separate installations for each function, which can be costly and cumbersome. Additionally, many current fly nets are not aesthetically pleasing and can obstruct the view when not in use. Moreover, energy-efficient window and door screens that offer thermal insulation are highly desirable to reduce energy consumption and carbon emissions.

Many blind systems are made to measure for retro-fitting to existing door or window openings. Small tolerances are required both when measuring the opening and when making the blind system to ensure that the unit will fit into the opening without leaving an unsightly gap around it.

The present invention is applicable not only to fixed buildings but also to mobile structures such as boats, land vehicles and caravans.

SUMMARY

The present invention is a single-unit double-track blind system that allows for simultaneous use of a fly net and a blind, as defined in claim 1.

Aspects of the invention that are preferred but not essential are defined in the dependent claims.

The system comprises two tracks, one for the fly net and the other for the blind, combined in a single unit. The tracks are positioned side by side so that the fly net and the blind operate in parallel planes, and can both be moved independently using a pull rod system. The fly net contains a mesh that can be easily pulled across the window or door opening to prevent insects from entering the room. The blind contains a material that can be adjusted to control the amount of light, privacy, and thermal insulation in the room. The system is easy to install and can be customized to fit various window and door sizes.

The unit may comprise four corner pieces connected by four linear pieces to form a generally rectangular outline. At least some of the linear pieces may have a stepped cross-section, whereby, when the unit is mounted in a suitably sized window or door opening, an inner portion of the linear piece can fit inside the opening, while an outer portion of the linear piece can rest against a wall or frame adjacent to the opening. If a gap exists between the inner portions and the opening, it will be hidden by the outer portions, which reduces the precision required when measuring the opening or manufacturing and installing the unit. In this arrangement, one of the two tracks is preferably provided on the inner portions of the linear pieces so that one of the fly net and the blind operates within the opening, while the other of the two tracks is provided on the outer portions of the linear pieces so that other of the fly net and the blind operates across the face of the opening.

DRAWINGS

DESCRIPTION

The present invention is a single-unit double-track blind system with fly net and blind. The system comprises two tracks, one for the fly net and the other for the blind, combined in a single unit. The tracks are made of a durable material and are positioned side by side so that the blind and the fly net move in parallel planes, typically with the blind in front of the fly net as viewed from inside the room.

The unit comprises four corner pieces 2A, 2B, 4A, 4B connected by four linear pieces 10A, 10B, 13, 18 to form a generally rectangular frame. Each corner piece receives the ends of two of the linear pieces at right angles to one another. Snap-fit features may be provided on each corner piece 2A, 2B, 4A, 4B to retain the ends of the linear pieces. The system can be customized to fit various window and door sizes. The single-unit double-track system is designed to fit snugly within the window or door opening. The linear pieces 10A, 10B, 13, 18 each have a uniform cross-section, for example being formed as aluminium extrusions, so they can be cut to the desired lengths to match the height and width of the opening using a saw or other suitable cutting tool. Cut-outs or other features may then be formed at the ends of the linear pieces for securing them to the corner pieces 2A, 2B, 4A, 4B. The fly net and the blind can also be customised to fit the window or door size. It should be understood that, in order to show all the features at an appropriate scale, the drawings illustrate a unit in which the size of the opening is very small compared with a typical door or window.

Figure 8:
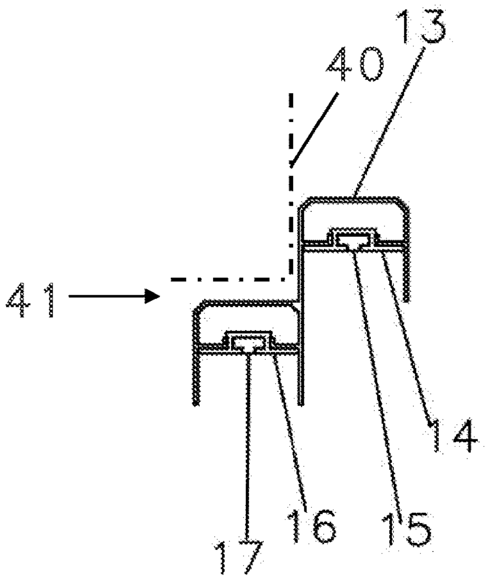
FIG. 8 is a cross-section of an upper linear piece of the system shown in FIG. 1.

Each of the linear pieces 10A, 10B, 13, 18 comprises two channels that are arranged side-by-side, with the channels opening inwards towards the centre of the unit. The front channel (as viewed from inside the room where the unit is to be installed) provides a track for the blind and the rear channel provides a track for the fly net. The extruded cross-section of each linear piece provides each channel with a central slot. The slot may support a liner, which in turn holds a central strip. Specifically:

- As shown in FIG. 8, the top linear piece 13 comprises a front channel with a liner 14 and a central strip 15, and a rear channel with a liner 16 and a central strip 17.

Figure 9:
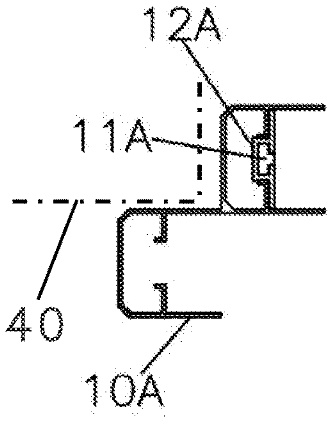
FIG. 9 is a cross-section of a left side linear piece of the system shown in FIG. 1.

As shown in FIG. 9, the left side linear piece 10A comprises a front channel without a liner or a central strip, and a rear channel with a liner 12A and a central strip 11A.

Figure 10:
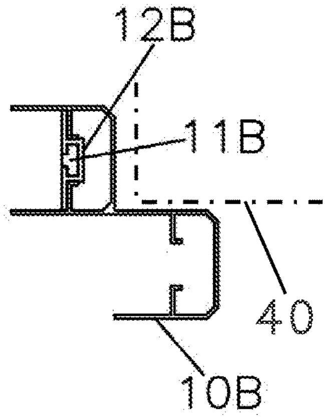
FIG. 10 is a cross-section of a right side linear piece of the system shown in FIG. 1.

As shown in FIG. 10, the right side linear piece 10B comprises a front channel without a liner or a central strip, and a rear channel with a liner 12B and a central strip 11B.

Figure 11:
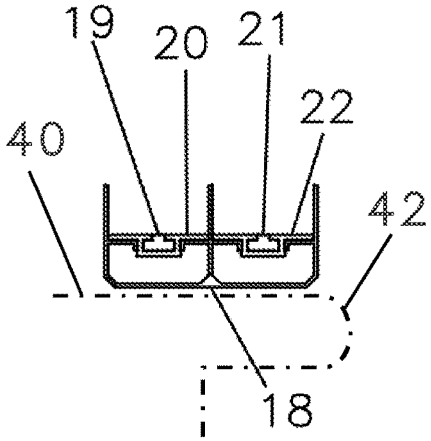
FIG. 11 is a cross-section of a lower linear piece of the system shown in FIG. 1.

As shown in FIG. 11, the bottom linear piece 18 comprises a front channel with a liner 21 and a central strip 22, and a rear channel with a liner 20 and a central strip 19.

Figure 3:
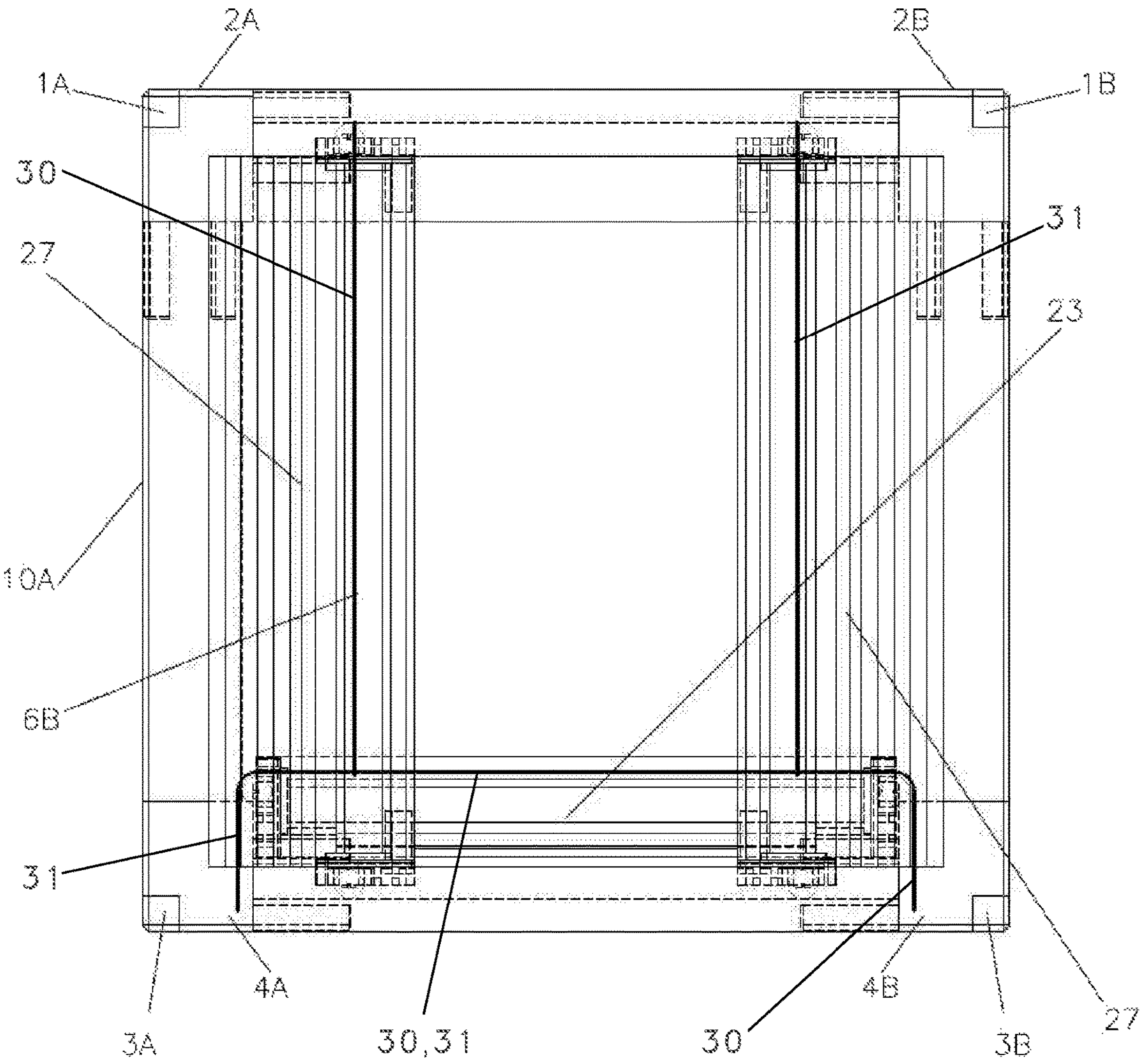
FIG. 3 is a front view of the system of claim 1, with both the blind and fly net open.
Figure 4:
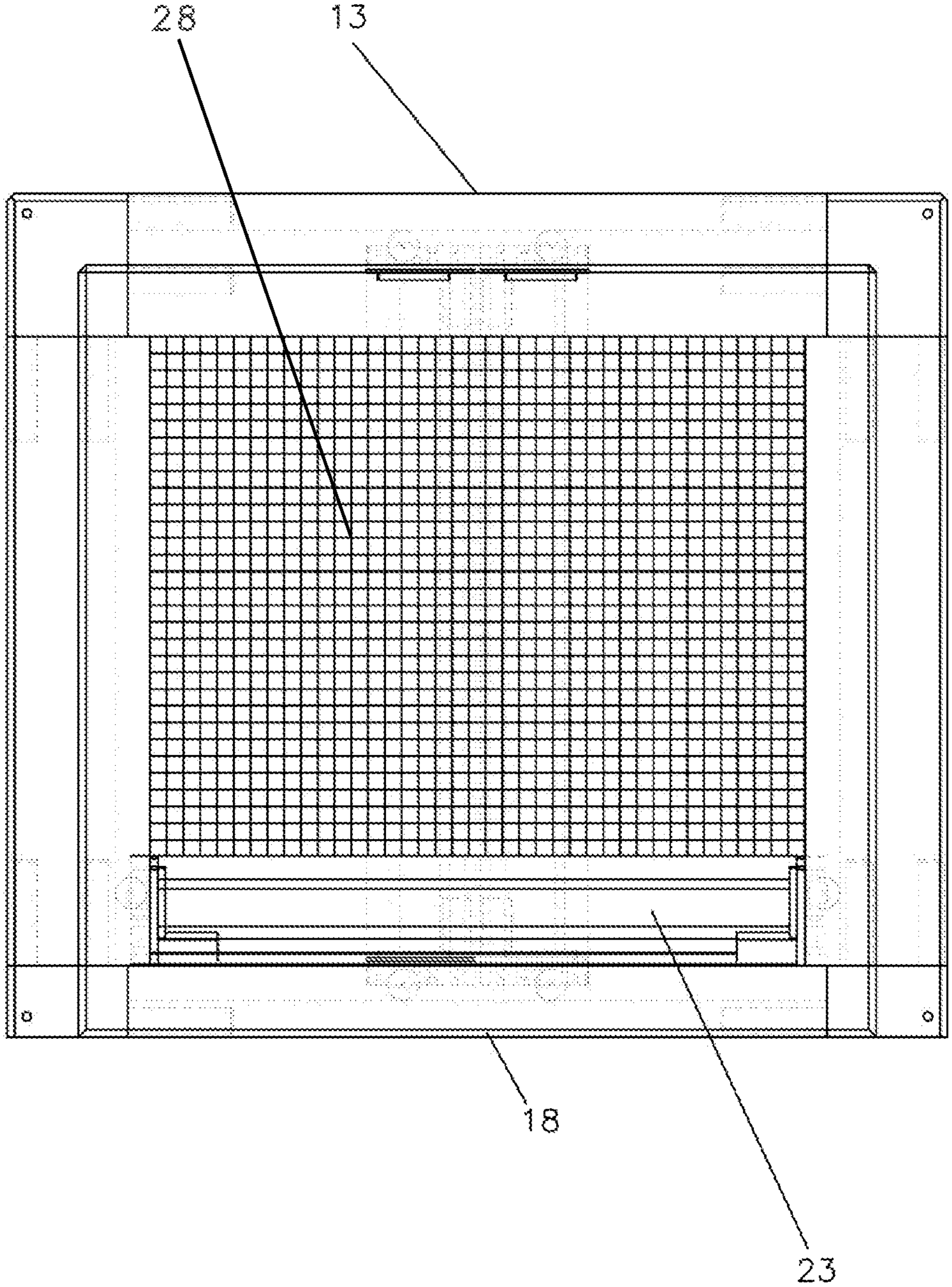
FIG. 4 is a rear view of the system of claim 1, with both the blind and the fly net closed.
Figure 6:
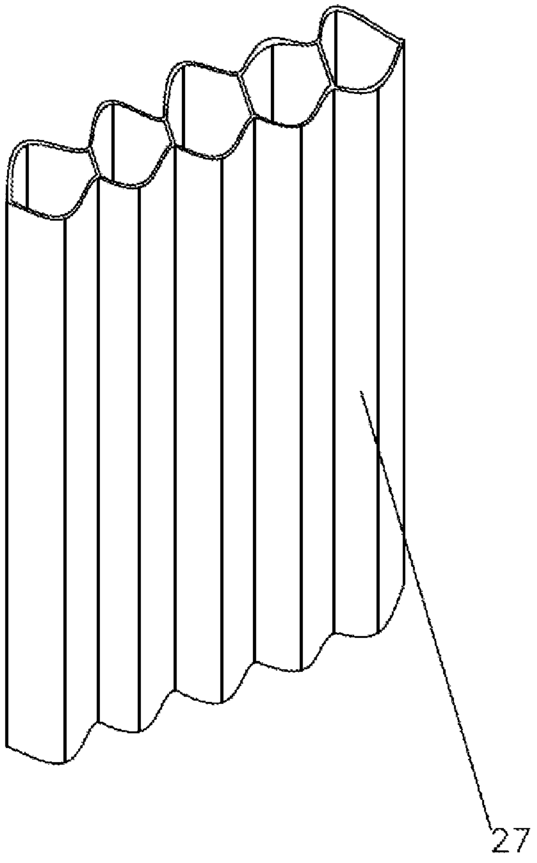
FIG. 6 is a perspective view of part of an alternative form of the blind of the system of FIG. 1.
Figure 7:
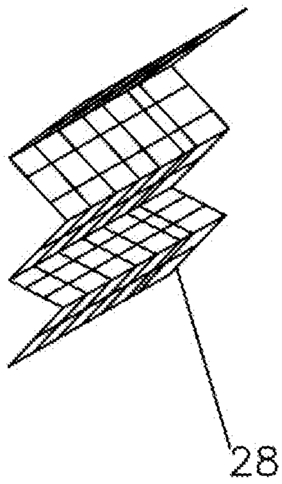
FIG. 7 is a perspective view of part of the fly net of the system of FIG. 1.

The fly net track contains a mesh 28 that is designed to prevent insects from entering the room. The mesh may be made of a material that is transparent to allow maximum light through the window opening when it is in use and it can be moved out of the way of the opening to allow for an unobstructed view when not in use. Preferably, the mesh 28 is formed into parallel folds, alternately in opposite directions, to create a zig-zag profile as shown in FIG. 6. An upper end of the mesh 28 is anchored in the rear channel of the top linear piece 13. The anchoring may be achieved by clips (not illustrated) received in the slot of the top linear piece 13. A lower end of the mesh 28 is attached to a pull rod 23, which can be moved up or down to open the fly net, as seen in FIG. 3, or to close it, as seen in FIG. 4. The ends of the pull rod 23 carry small wheels, which run in a track formed by the rear channels of the left and right side linear pieces 10A, 10B. The track may offer sufficient friction to retain the fly net in the open position. Alternatively, a latch (not illustrated) may be provided to secure the pull rod 23 temporarily at its uppermost position, shown in FIG. 3, and optionally at other defined positions along the track. A catch (not illustrated), for example using a magnet, may be provided to secure the pull rod 23 temporarily at its lowermost position, shown in FIG. 4.

Figure 5:
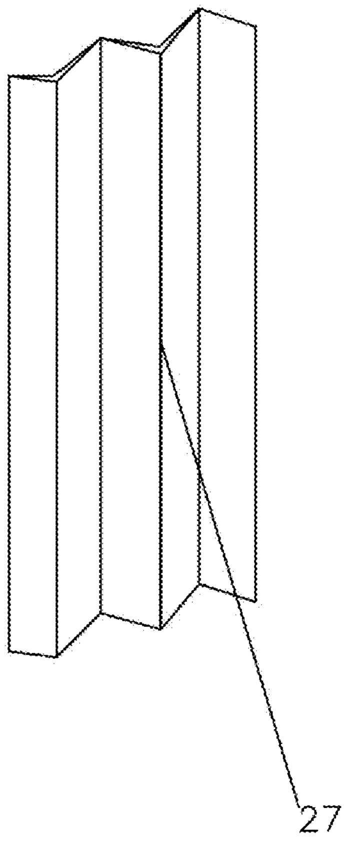
FIG. 5 is a perspective view of part of one form of the blind of the system of FIG. 1.

The blind track contains a material 27 that is at least partially opaque so the blind can be adjusted to control the amount of light, privacy, and thermal insulation in the room. The material is chosen for its durability, ease of cleaning, and aesthetic appeal. The blind material can be designed to have thermal insulation properties that can reduce energy consumption and improve the energy efficiency of a building. The material 27 of the blind may be formed into parallel folds, alternately in opposite directions, to create a panel with a zig-zag profile as shown in FIG. 5. Alternatively, the panel may comprise two generally parallel layers of the material 27, formed to have mirror-image zig-zag profiles and connected together at intervals to form a "honeycomb" structure of parallel cells, as shown in FIG. 6. The honeycomb structure of FIG. 6 has better thermally insulating properties than the single layer blind of FIG. 5.

Figure 1:
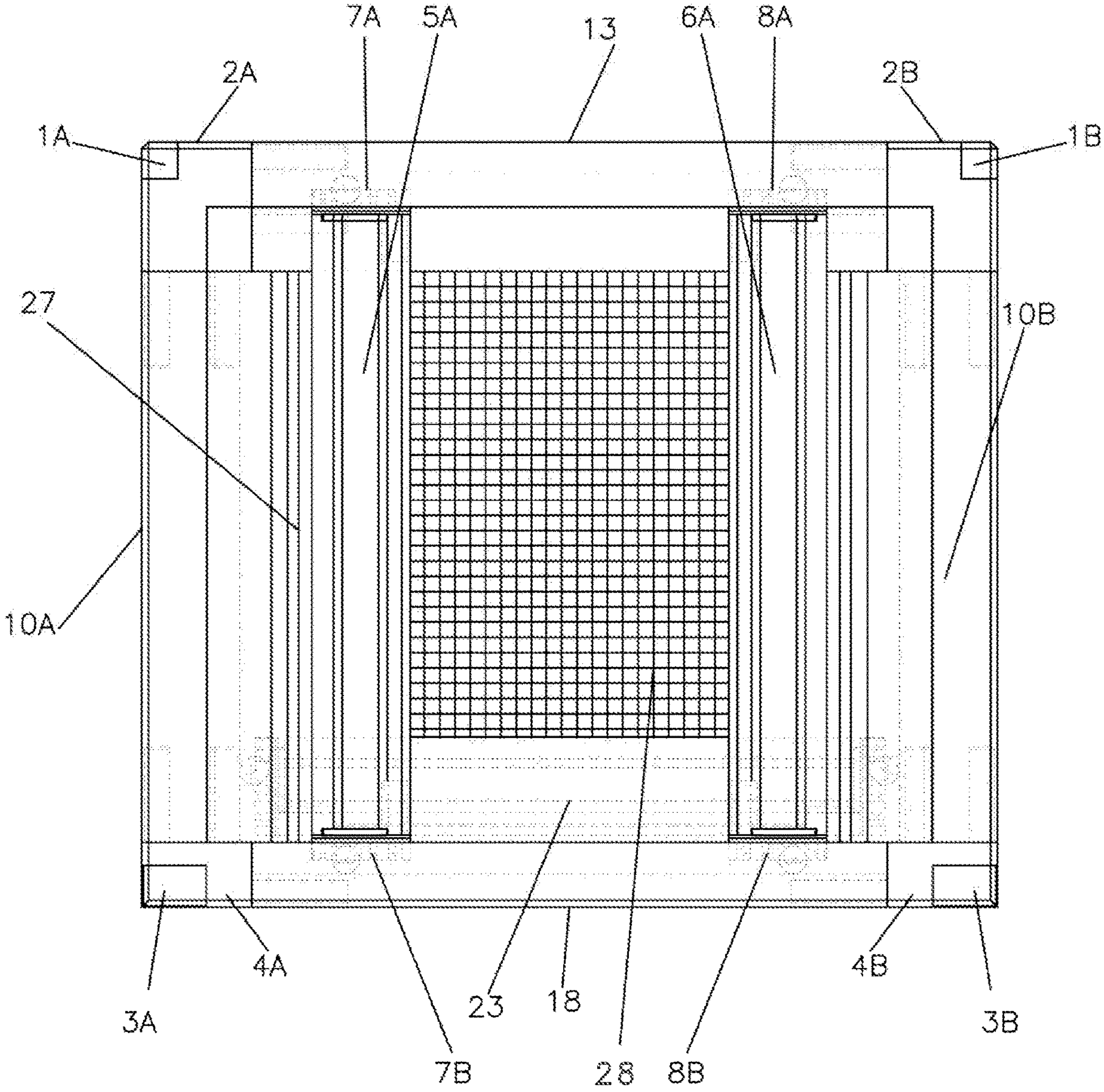
FIG. 1 is a front view of a first embodiment of a double-track blind system according to the invention, with the blind open but the fly net closed.
Figure 2:
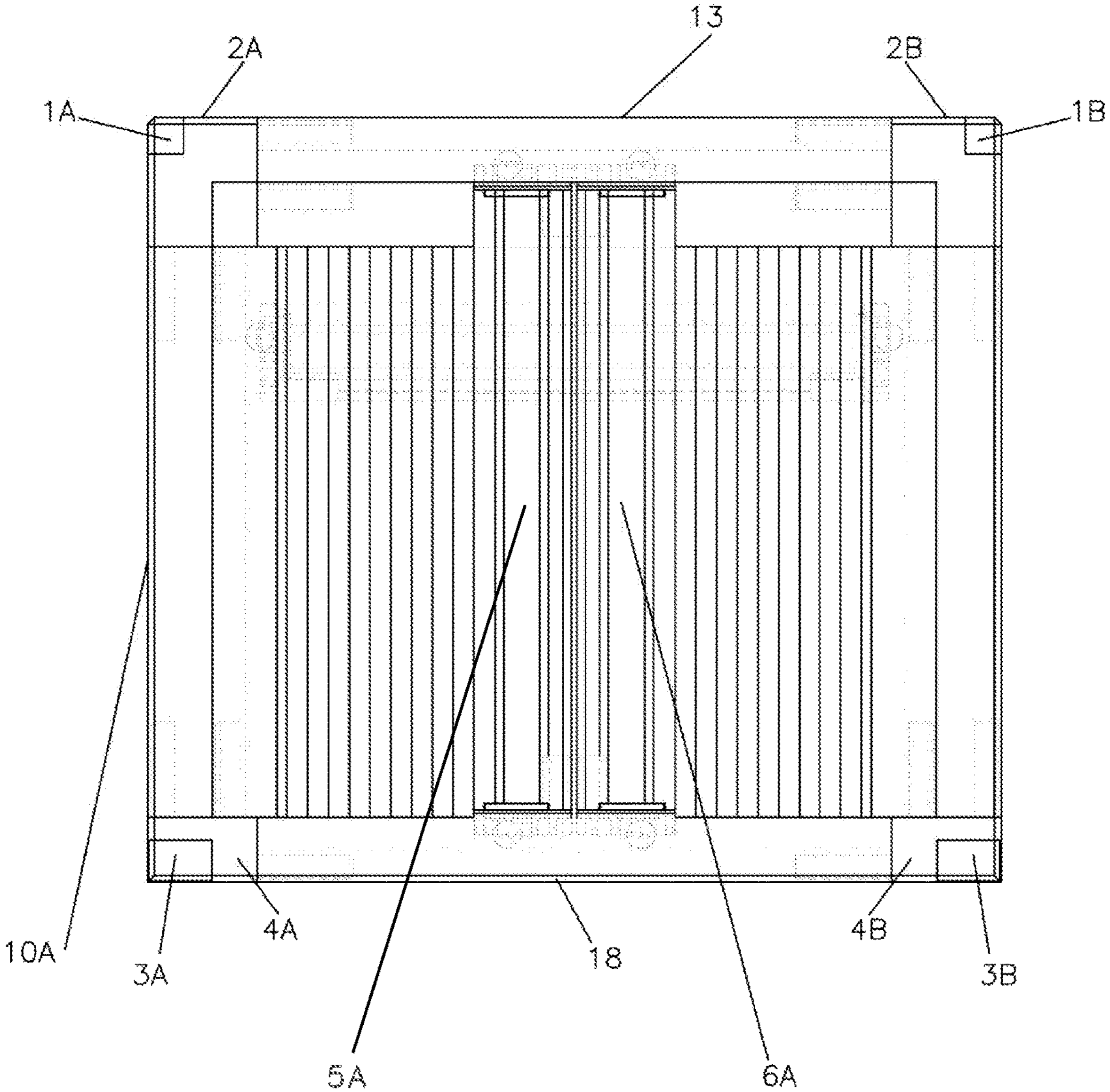
FIG. 2 is a front view of the system of claim 1, with both the blind and the fly net closed.

In the illustrated unit, the blind comprises a pair of panels of the material 27, respectively anchored at opposite sides of the opening. The anchoring may be achieved by clips (not illustrated) received in the slots of the left and right side linear pieces 10A, 10B. The free ends of the panels are attached respectively to pull rods 5A, 6A so that the blind can be closed by drawing the two pull rods towards one another and can be opened by drawing them apart. The upper ends 7A, 8A of the pull rods 5A, 6A carry small wheels, which run in the front channel of the top linear piece 13. The lower ends 7B, 8B of the pull rods 5A, 6A similarly carry small wheels, which run in the front channel of the bottom linear piece 18. The blind track may offer sufficient friction to retain the blind in the closed position shown in FIG. 2 or a catch (not illustrated), for example using a magnet, may be provided to hold the two pull rods 5A, 6A temporarily together.

The material 27 of the blind may be wholly opaque to function as a blackout blind that prevents light entering the room through the window opening or it may be translucent to allow some light to enter the room, while still providing a level of thermal insulation. If the blind comprises a pair of panels, as illustrated, the two panels may comprise materials of different opacity. For example, one panel may be formed from an opaque material and the other panel may be formed from a translucent material, each panel being wide enough to cover the whole of the opening when extended. Then, by holding both pull rods 5A, 6A together and sliding them to one or other side of the opening, the user has the choice between operating the blind as a blackout blind or a translucent blind.

FIG. 3 shows a system of cords, which are attached to the fly net pull rod 23 to ensure that the pull rod 23 remains horizontal as it moves in its track. A first cord 30 is anchored at one end to the upper left of the frame, extends vertically then runs along the length of the pull rod 23, extends vertically again and is anchored at the other end to the lower right of the frame. A second cord 31 is anchored at one end to the upper right of the frame, extends vertically then runs along the length of the pull rod 23, extends vertically again and is anchored at the other end to the lower left of the frame. The central strips 11A, 11B received in the channels of the fly net track help to manage the movement of the cords. In practice, the cords 30, 31 would be hidden from view inside the frame and the pull rod 23 or would be concealed within the fly net during use of the unit. Each of the pull rods 5A, 6A of the blind would have a similar pair of cords (not illustrated) associated with it to ensure that the respective pull rod remains vertical as it moves in its track.

As shown in FIGS. 8 to 10, at least some of the linear pieces 10A, 10B, 13, 18 may have a stepped cross-section, whereby the base of the rear channel is offset inwards from the base of the front channel, i.e. towards the centre of the opening. Accordingly, the inner, rear channels combine to form a frame of smaller dimensions than the frame formed by the outer, front channels. When the unit is mounted in a suitably sized window or door opening, indicated in FIGS. 8 to 11 by dot-dash lines 40, the smaller frame formed by the rear channels can fit inside the opening, while the larger frame formed by the front channels extends beyond the opening, with rear surfaces of the front channels resting against a wall adjacent to the opening. If a gap 41 exists between the smaller frame and the opening, it will be overlapped and hidden by the larger frame to prevent light or air passing through the gap. This reduces the precision required when measuring the opening or when manufacturing and installing the unit. In the illustrated unit, the rear channels form the fly net track so the fly net is disposed within the opening, while the front channels form the blind track so the blind is disposed across the face of the opening.

It is not essential that all the linear pieces 10A, 10B, 13, 18 should have the stepped cross-section. In the illustrated unit, the bottom of the window opening, seen in FIG. 11, may comprise a sill 42 that extends into the room, which would prevent an enlarged front frame from lying flush against the wall in that area. Accordingly, the bottom linear piece 18 does not have the stepped cross-section but has the bases of the front and rear channels in alignment so that they can both rest on the sill 42.

In regions where the frame extends beyond the opening, the unit may be secured in place by using screws to attach the corner pieces 2A, 2B, 4A, 4B to the face of the adjacent wall. Inserts 1A, 1B, 3A, 3B may be pushed into each corner piece to hide the heads of the screws. Alternatively, in installations where the unit is resting on a sill 42, so that the fixings do not need to support the weight of the unit, it may be sufficient to adhere the unit to the wall, e.g. using nano tape, thereby avoiding the need to drill into the wall.

In other embodiments of the invention (not illustrated) none of the linear pieces 10A, 10B, 13, 18 have the stepped cross-section, whereby the entire unit can fit inside the window or door opening. The dual tracks system can be mounted on the inside of the window or door opening using brackets. The brackets are made of a durable material such as metal or plastic and are designed to hold the tracks securely in place. The tracks are connected to the brackets using screws or other suitable fasteners. The tracks can be easily removed for cleaning or replacement.

For convenience of manufacture, stock control, etc., all the linear pieces may have the same cross-section. However, bearing in mind that in the illustrated embodiment of the invention the blinds move only along the track formed by the top and bottom linear pieces, while the fly net moves only along the track formed by the left and right side linear pieces, it will be understood that the horizontal and vertical linear pieces could have different cross-sections, comprising only the tracks that will actually be used. It will be understood that the fly net and the blind do not need to be configured in the same way as in the illustrated unit. The blind does not need to comprise two panels but could be a single panel in the same manner as the illustrated fly net. The fly net does not need to comprise a single panel but could comprise two panels in the same manner as the illustrated blind (albeit that the two pull rods meeting in the centre of the opening would then obstruct the view through it). The blind track and the fly track operate in parallel planes so they are independent of one another and it is not essential that they should move in perpendicular directions: instead, they could both move horizontally or both move vertically.

The invention claimed is:

1. A single-unit double-track blind system comprising two tracks, one for a fly net and the other for a blind, combined in a single unit:

wherein each track comprises a channel in which a respective one of the fly net or the blind is movable between open and closed positions;

wherein the unit comprises four corner pieces connected by four linear pieces to form a generally rectangular outline;

wherein the tracks are provided on the linear pieces;

wherein at least some of the linear pieces have a stepped cross-section, whereby, when the unit is mounted in a suitable sized window or door opening, an inner portion of each stepped linear piece can fit inside the opening, while an outer portion of each stepped linear piece can rest against a wall or frame adjacent to the opening.

2. The system of claim 1, wherein each linear pieces has a uniform cross-section so that it can be cut to a desired length to adapt the unit for use in window and door openings of varying sizes.

3. The system of claim 1, wherein one of the two tracks is provided on the inner portions of the stepped linear pieces, while the other of the two tracks is provided on the outer portions of the stepped linear pieces.

* * * * *